United States Patent
Du et al.

(10) Patent No.: US 10,004,059 B2
(45) Date of Patent: Jun. 19, 2018

(54) SERVICE ADVERTISEMENT MESSAGE TRANSMISSION METHOD AND DEVICE

(71) Applicant: HUAWEI DEVICE (DONGGUAN) CO., LTD., Dongguan (CN)

(72) Inventors: Zhenguo Du, Shenzhen (CN); Ji Chen, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 239 days.

(21) Appl. No.: 14/881,682

(22) Filed: Oct. 13, 2015

(65) Prior Publication Data

US 2016/0037483 A1     Feb. 4, 2016

Related U.S. Application Data

(63) Continuation of application No. PCT/CN2014/077215, filed on May 12, 2014.

(30) Foreign Application Priority Data

May 15, 2013   (CN) .......................... 2013 1 0179966

(51) Int. Cl.
   *H04W 68/10*      (2009.01)
   *H04B 17/318*    (2015.01)
   (Continued)

(52) U.S. Cl.
   CPC .......... *H04W 68/10* (2013.01); *H04B 17/318* (2015.01); *H04W 4/06* (2013.01);
   (Continued)

(58) Field of Classification Search
   None
   See application file for complete search history.

(56) References Cited

U.S. PATENT DOCUMENTS

| 6,604,140 | B1 | 8/2003 | Beck et al. |
| 2010/0010899 | A1* | 1/2010 | Lambert ............... G06Q 30/02 705/14.58 |

(Continued)

FOREIGN PATENT DOCUMENTS

| CN | 103037448 | 4/2013 |
| EP | 1 511 218 A1 | 3/2005 |

(Continued)

OTHER PUBLICATIONS

International Search Report dated Aug. 29, 2014 in corresponding international application PCT/CN2014/077215.
(Continued)

*Primary Examiner* — Edan Orgad
*Assistant Examiner* — Saumit Shah
(74) *Attorney, Agent, or Firm* — Staas & Halsey LLP

(57) ABSTRACT

Embodiments of the present invention disclose a service advertisement message transmission method and device. The method in the embodiments of the present invention includes: generating, by a first device, a first service advertisement message, where the first service advertisement message includes first service information of the first device and second service information of a second device; the second service information is obtained by the first device from a received message sent by the second device; the first service information is used to enable a device in a communication range of the first device to learn service information of the first device; and the second service information is used to enable a device in a communication range of the second device to learn service information of the second device; and sending, by the first device, the first service advertisement message.

16 Claims, 4 Drawing Sheets

(51) Int. Cl.
*H04W 8/00* (2009.01)
*H04W 4/06* (2009.01)
*H04W 68/00* (2009.01)
*H04W 4/20* (2018.01)
*H04W 76/00* (2018.01)
*H04L 29/08* (2006.01)

(52) U.S. Cl.
CPC ............ *H04W 8/005* (2013.01); *H04L 67/16* (2013.01); *H04W 4/206* (2013.01); *H04W 68/00* (2013.01); *H04W 76/002* (2013.01)

(56) References Cited

U.S. PATENT DOCUMENTS

| | | | |
|---|---|---|---|
| 2011/0055326 A1 | 3/2011 | Michaelis et al. | |
| 2011/0153773 A1 | 6/2011 | Vandwalle et al. | |
| 2011/0161480 A1 | 6/2011 | Kim et al. | |
| 2014/0185468 A1* | 7/2014 | Park | H04W 48/16 370/252 |
| 2014/0211696 A1 | 7/2014 | Chai et al. | |

FOREIGN PATENT DOCUMENTS

| | | |
|---|---|---|
| EP | 1 542 409 A1 | 6/2005 |
| KR | 10-2011-0074066 | 6/2011 |

OTHER PUBLICATIONS

PCT International Search Report dated Aug. 29, 2014 in corresponding International Patent Application No. PCT/CN2014/077215.
"Marketing Requirements Document for Interoperability Testing of Neighbor Awareness Networking", Wi-Fi Alliance Neighbor Awareness Networking Marketing Task Group, Version 1.0, 2012, 27 pp.
"Specification Requirements Document for Neighbor Awareness Networking", Wi-Fi Alliance Neighbor Awareness Networking Marketing Task Group, Version 0.04. 2012, 10 pp.
"Wi-Fi Peer-to-Peer (P2P) Technical Specification", Wi-Fi Alliance Technical Committee P2P Task Group, Version 1.2, 2010, 159 pp.
Extended European Search Report dated May 3, 2016 in corresponding European Patent Application No. 14798091.6.

* cited by examiner

SERVICE ADVERTISEMENT MESSAGE TRANSMISSION METHOD AND DEVICE

CROSS-REFERENCE TO RELATED APPLICATIONS

This application is a continuation of International Application No. PCT/CN2014/077215, filed on May 12, 2014, which claims priority to Chinese Patent Application No. 201310179966.1, filed on May 15, 2013, both of which are hereby incorporated by reference in their entireties.

TECHNICAL FIELD

The present invention relates to the field of wireless communications, and in particular, to a service advertisement message transmission method and device.

BACKGROUND

With coming of a mobile Internet era, social, local, and mobile have become a mainstream pattern in the Internet industry. Particularly, with popularization of a mobile terminal device equipped with a wireless fidelity (Wi-Fi, wireless fidelity) interface, a Wi-Fi-based social application is becoming a hot topic in the industry. Therefore, the Wi-Fi Alliance (WFA, Wi-Fi Alliance) establishes a task force for the social (social) application, such as neighbor awareness networking (NAN, Neighbor Awareness Networking), so as to study impact of the Wi-Fi-based social application on Wi-Fi, and formulate related standards.

A typical scenario studied by the NAN task force is that before associating with each other, peer mobile devices mutually discover the devices and services that can be provided by the devices. For example, in a social game application, two mobile devices discover each other by using Wi-Fi, and confirm whether a counterpart device has a same game hobby as itself before associating with each other, so as to avoid a waste of signaling overheads caused due to the fact that the two devices are found have different interests after they are associated with each other. For another example, in a friend discovery application, when two devices that both enable the friend discovery application approach to each other, the devices remind users of appearance of a counterpart device. The key to the foregoing discovery process is device discovery and service discovery which can be simultaneously completed. The former is relatively simple, but the latter is relatively complex due to the diversity of services. Therefore, service discovery is currently a main study topic, and is also a main objective of the present invention.

Technically, a process of service discovery is completed mainly by using the following method: A detection device transmits a service advertisement message on a social channel (which is usually a 1/6/11 channel on the 2.4 GHz band), and then monitors a service response message; and after a peer device detects, by listening, the service advertisement message, if service information carried by the service advertisement message indicates that the service information meets a requirement of the peer device, the peer device sends a service discovery response message. According to a service discovery requirement of the NAN, even though a service discovery task is already finished, a service discovery mechanism still needs to be continuously operating in a background (because there is generally more than one target of service discovery). In a case in which Wi-Fi devices are densely distributed, because the solution in the prior art requires that each detection device should frequently send a service advertisement message to ensure relatively high discovery efficiency, the social channel is filled with small packets of this type of service advertisement message, causing "a small-packet storm" and low service discovery efficiency and media utilization, and greatly affecting normal operating of another Wi-Fi network.

SUMMARY

Embodiments of the present invention provide a service advertisement message transmission method and device, which are used to ensure service discovery efficiency and improve media utilization efficiency.

A service advertisement message transmission method provided by a first aspect of an embodiment of the present invention includes:

generating, by a first device, a first service advertisement message, where the first service advertisement message includes first service information of the first device and second service information of at least one second device; the second service information is obtained by the first device from a received message sent by the second device; the first service information is used to enable a device in a communication range of the first device to learn service information of the first device; and the second service information is used to enable a device in a communication range of the second device to learn service information of the second device; and sending, by the first device, the first service advertisement message.

In a first possible implementation manner of the first aspect, before the generating a first service advertisement message, the method includes:

receiving a second service advertisement message sent by the at least one second device, where the second service advertisement message includes the second service information; and adding the second service information to a carrying candidate list, where the carrying candidate list is used to store non-local service information that can be sent by being carried in the first service advertisement message.

With reference to the first aspect or the first implementation manner of the first aspect, in a second possible implementation manner of the first aspect, the first service information includes a service identifier and operating regularity information of the first device;

the second service information includes a service identifier and operating regularity information of the second device; and the operating regularity information includes time information and/or channel information.

With reference to the second implementation manner of the first aspect, in a third possible implementation manner of the first aspect, the first service information includes a service information validity period and/or device address information of the first device; and the second service information includes a service information validity period and/or device address information of the second device.

With reference to the first possible implementation manner of the first aspect, in a fourth possible implementation manner, if the second service advertisement message includes service information of multiple devices, the generating a first service advertisement message includes:

extracting only the second service information of the second device from the second service advertisement message, and storing the second service information in a carrying candidate list of the first device; and randomly selecting N pieces of second service information from the carrying candidate list of the first device to generate the first service advertisement message, where N is an integer greater than zero; N is less than or equal to a quantity of second service information stored in the carrying candidate list; and a total data amount of the N pieces of second service information is less than a message packet capacity of the first service advertisement message.

With reference to the first aspect and any one of the first to the fourth possible implementation manners of the first aspect, in a fifth possible implementation manner, before the generating a first service advertisement message, the method further includes:

determining, according to transceiving status of the first service advertisement message, whether the first device is in a dense environment;

if the first device is in a dense environment, triggering the step of generating a first service advertisement message; and if the first device is not in a dense environment, sending a first service advertisement message that does not carry the second service information.

With reference to the fifth possible implementation manner of the first aspect, in a sixth possible implementation manner, the determining, according to transceiving status of the service advertisement message, whether the first device is in a dense environment includes:

in predefined time $T_0$, separately collecting statistics on the quantity $V_{sparse}$ of received service advertisement messages in a sparse mode and the quantity $V_{dense}$ of received service advertisement messages in a dense mode, where when $\alpha_1 V_{sparse} + \alpha_2 V_{dense} > thr_1$, the first device is considered to be in a dense environment, where $\alpha 1$ and $\alpha 2$ are respectively weighting coefficients of $V_{sparse}$ and $V_{dense}$, and $thr_1$ is a first dense environment threshold; or when $(\alpha_1 V_{sparse} T_1 + \alpha_2 V_{dense} T_2)/T_0 > thr_2$, the first device is considered to be in a dense environment, where $\alpha_1$ and $\alpha_2$ are respectively weighting coefficients of $V_{sparse}$ and $V_{dense}$, and $thr_2$ is a second dense environment threshold; or collecting statistics on an average value $T_A$ of waiting time for sending the first service advertisement message, where if $T_A > thr_3$, the first device is considered to be in a dense environment; the waiting time is time needed by the first device from monitoring a channel to successfully sending the first service advertisement message; and $thr_3$ is a third dense environment threshold.

With reference to any one of the first to the sixth possible implementation manners of the first aspect, in a seventh possible implementation manner, after the receiving a second service advertisement message sent by the second device, the method includes:

acquiring a received signal strength indicator RSSI of the second service advertisement message, where if the RSSI is greater than a first RSSI threshold, adding the second service information to the carrying candidate list of the first device.

With reference to any one of the first to the seventh possible implementation manners of the first aspect, in an eighth possible implementation manner, if the second service advertisement message further carries third service information, the method further includes:

determining whether the third service information is a service needed by the first device, and if the third service information is a service needed by the first device, returning a service response message to a third device that generates the third service information.

With reference to the eighth possible implementation manner of the first aspect, in a ninth possible implementation manner, before the returning a service response message to a third device that generates the third service information, the method includes:

acquiring the RSSI of the second service advertisement message; and if the RSSI is greater than a second RSSI threshold, triggering the step of returning a service response message to a third device that generates the third service information.

With reference to the eighth or the ninth possible implementation manner of the first aspect, in a tenth possible implementation manner, after the receiving a second service advertisement message sent by the second device, the returning a service response message to a third device that generates the third service information is specifically:

sending the service response message to the third device at first power, where the first power is higher than second power used by the second device to send the second service advertisement message.

A service advertisement message transmission device provided by a second aspect of an embodiment of the present invention includes:

a message generating unit, configured to generate a first service advertisement message, where the first service advertisement message includes first service information of a first device and second service information of at least one second device; the second service information is obtained by the first device from a received message sent by the second device; the first service information is used to enable a device in a communication range of the first device to learn service information of the first device; and the second service information is used to enable a device in a communication range of the second device to learn service information of the second device; and a message sending unit, configured to send the first service advertisement message.

In a first possible implementation manner of the second aspect, the device further includes:

a message receiving unit, configured to: before the first service advertisement message is generated, receive a second service advertisement message sent by the at least one second device, where the second service advertisement message includes the second service information; and a storing unit, configured to add the second service information to a carrying candidate list, where the carrying candidate list stores non-local service information that can be sent by being carried in the first service advertisement message.

With reference to the first possible implementation manner of the second aspect, in a second possible implementation manner, the message sending unit includes:

an information extracting module, configured to extract only the second service information of the second device from the second service advertisement message, and store the second service information in a carrying candidate list of the first device; and an information selecting module, configured to randomly select N pieces of second service information from the carrying candidate list of the first device to generate the first service advertisement message, where N is an integer greater than zero; N is less than or equal to a quantity of second service information stored in the carrying candidate list; and a total data amount of the N pieces of second service information is less than a message packet capacity of the first service advertisement message.

With reference to the second aspect or any one of the first to the second implementation manners of the second aspect, in a third possible implementation manner of the second aspect, the device further includes:

an environment determining unit, configured to determine, according to transceiving status of the service advertisement message, whether the first device is in a dense environment; if the first device is in a dense environment, trigger the message generating unit to generate the first service advertisement message; and if the first device is not in a dense environment, directly trigger the message sending unit to send a first service advertisement message that does not carry the second service information.

With reference to the third possible implementation manner of the second aspect, in a fourth possible implementation manner, the environment determining unit includes:

a first determining module, configured to, in predefined time $T_0$, separately collect statistics on a quantity $V_{sparse}$ of received service advertisement messages in a sparse mode and a quantity $V_{dense}$ of received service advertisement messages in a dense mode, where when $\alpha_1 V_{sparse} + \alpha_2 V_{dense} > thr_1$, the first device is considered to be in a dense environment, where $\alpha_1$ and $\alpha_2$ are respectively weighting coefficients of $V_{sparse}$ and $V_{dense}$, and $thr_1$ is a first dense environment threshold;

or a second determining module, configured to, in predefined time $T_0$, separately collect statistics on a quantity $V_{sparse}$ of received service advertisement messages in a sparse mode and a quantity $V_{dense}$ of received service advertisement messages in a dense mode, where when $(\alpha_1 V_{sparse} T_1 + \alpha_2 V_{dense} T_2)/T_0 > thr_2$, the first device is considered to be in a dense environment, where $\alpha_1$ and $\alpha_2$ are respectively weighting coefficients of $V_{sparse}$ and $V_{dense}$, and $thr_2$ is a second dense environment threshold;

or a third determining module, configured to: in predefined time, calculate an average value $T_A$ of waiting time for sending the first service advertisement message, or calculate an average value $T_A$ of several times of waiting time for sending the first service advertisement message, where if $T_A > thr_3$, the first device is considered to be in a dense environment; the waiting time is time needed by the first device from monitoring a channel to successfully sending the first service advertisement message; and $thr_3$ is a third dense environment threshold.

With reference to any one of the first to the fourth possible implementation manners of the second aspect, in a fifth possible implementation manner, the device further includes:

a signal acquiring unit, configured to acquire an RSSI of the second service advertisement message, where the storing unit is specifically configured to: if the RSSI is greater than a first RSSI threshold, add the second service information to the carrying candidate list of the first device.

With reference to any one of the first to the fifth possible implementation manners of the second aspect, in a sixth possible implementation manner, the device further includes:

a service determining unit, configured to: if the second service advertisement message further carries third service information, determine whether the third service information is a service needed by the first device, where the message sending unit is further configured to: when a result of the determining of the service determining unit is yes, return a service response message to a device that generates the third service information.

With reference to the sixth possible implementation manner of the second aspect, in a seventh possible implementation manner, the device further includes:

the signal acquiring unit, configured to acquire the RSSI of the second service advertisement message; and a response determining unit, configured to: if the RSSI is greater than a second RSSI threshold, trigger the message sending unit to return the service response message to the device that generates the third service information.

With reference to the sixth or the seventh possible implementation manner of the second aspect, in an eighth possible implementation manner, the message sending unit is specifically configured to send, at first power, the service response message to the device corresponding to the third service information, where the first power is higher than second power used by the second device to send the second service advertisement message.

It can be learned from the foregoing technical solutions that embodiments of the present invention have the following advantages:

In the embodiments of the present invention, after a first device receives second service information sent by a second device, the first device adds the second service information into a first service advertisement message, so that one service advertisement message carries service information of at least two devices, thereby improving utilization efficiency of the service advertisement message. Therefore, in a case in which service discovery effects are the same, frequency of mutually sending service advertisement messages by peer devices can be reduced, which further reduces an occurrence possibility of "a small-packet storm".

BRIEF DESCRIPTION OF DRAWINGS

Embodiments of the present invention provide a service advertisement message transmission method and device, which are used to ensure service discovery efficiency and improve media utilization efficiency.

Figure 1:
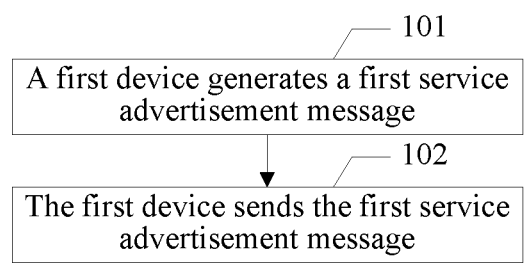
FIG. 1 is a schematic flowchart of a service advertisement message transmission method according to an embodiment of the present invention.

Referring to FIG. 1, an embodiment of a service advertisement message transmission method according to an embodiment of the present invention includes:

101. A first device generates a first service advertisement message.

After the first device receives second service information sent by a second device, the first device generates the first service advertisement message, where the first service advertisement message includes first service information of the first device and the second service information of the second device, where the second service information is obtained by the first device from a received message sent by the second device, and the second device is a peer device of the first device; the first service information is used to enable a peer device in a communication range of the first device to learn communication information of the first device; and the second service information is used to enable a peer device in a communication range of the second device to learn communication information of the second device.

Optionally, the service advertisement message may be specifically a detection request message.

The peer devices are two devices that have a specific same function. Optionally, in this embodiment of the present invention, the first device and the peer device of the first device may be devices that have an NAN function.

In this embodiment of the present invention, a service advertisement message is used to propagate service information so as to achieve mutual discovery between peer devices. Service information carried in the service advertisement message includes service information of a sender (such as the first service information in this embodiment of the present invention), and may also include service information of a third party (that is, a peer device except the sender and a receiver, such as the second device in this embodiment of the present invention).

102. The first device sends the first service advertisement message.

In practical application, the first device may send the first service advertisement message around in a broadcasting manner, so that as many peer devices as possible can discover a service of the first device.

In this embodiment of the present invention, it may be understood that, the second device is relative to the first device. That is, if a local device receives a service advertisement message sent by another peer device, the local device used as a receiver is a first device, and the another peer device used as a sender is referred to as a second device relative to the first device. Further, if the service advertisement message sent by the second device includes third service information (that is not the second service information generated by the second device), a peer device that generates the third service information is referred to as a third device.

It may be understood that, the first device may receive service advertisement messages sent by multiple second devices, and therefore the first device may store multiple pieces of second service information.

In this embodiment of the present invention, after a first device receives second service information sent by a second device, the first device adds the second service information to a first service advertisement message, so that one service advertisement message carries service information of at least two devices, thereby improving utilization efficiency of the service advertisement message. Therefore, in a case in which service discovery effects are the same, frequency of mutually sending service advertisement messages by peer devices can be reduced, and a possibility that "a small-packet storm" occurs is further reduced.

Figure 2:
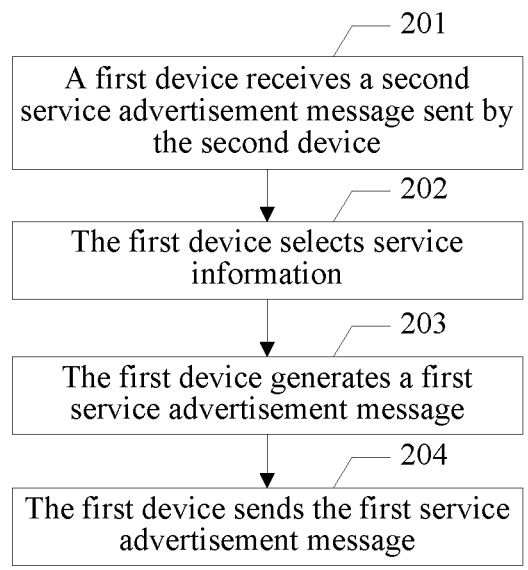
FIG. 2 is another schematic flowchart of a service advertisement message transmission method according to an embodiment of the present invention.

The following describes in detail a service advertisement message transmission method in the present invention. Referring to FIG. 2, another embodiment of a service advertisement message transmission method according to an embodiment of the present invention includes:

201. A first device receives a second service advertisement message sent by the second device.

The first device receives the second service advertisement message sent by the second device, where the second service advertisement message carries second service information, and the second device is a peer device of the first device.

Specifically, the second service information includes a service identifier and operating regularity information of the second device, where the service identifier is used to indicate a service provided by the second device, and/or a service needed by the second device; and the operating regularity information may specifically include time information and/or channel information. For example, the time information is wakeup time (that is used to indicate time when a peer device is in an activated state). For example, the channel information is an operating class and a channel number (that represents an operating channel on which a peer device in a monitoring state is to be located). It may be understood that, in practical application, the operating regularity information may further include other content, which is not specifically defined herein.

Further, the second service information may further include a service information validity period and/or device address information of the second device.

Specifically, the service information validity period may indicate a validity period during which another peer device may carry the service information. The service information is not valid when the validity period expires, and the another peer device no longer carries the service information. In some cases, the service information validity period may be represented by the time information in the operating regularity information, that is, the two are represented by a same value. The validity period may be a time value, and may also be another value, such as the number m of times (that is, the another peer device is allowed to carry the service information in only m service discovery request messages).

202. The first device selects service information.

After receiving the second service advertisement message sent by the second device, if the second service advertisement message includes service information of multiple devices, the first device may extract only the second service information of the second device from the second service advertisement message, and store the second service information in a carrying candidate list of the first device, where the carrying candidate list is used to store non-local service information that can be sent by being carried in the first service advertisement message.

According to a message packet capacity of the first service advertisement message, the first device selects N pieces of service information from the carrying candidate list of the first device as information that the first service advertisement message needs to carry, where N is an integer greater than zero.

In this embodiment of the present invention, in order to avoid that continuous forwarding of service information of one peer device causes that the service information is forwarded outside a communication range of a device that originally sends the service information, it is limited in this embodiment of the present invention that only service information corresponding to a sender is forwarded. Optionally, according to an actual condition, the first device may further select, from the second service advertisement message, one or two pieces of service information in addition to the second service information for forwarding.

203. The first device generates a first service advertisement message.

After service information that needs to be carried is determined, the first device generates the first service advertisement message, where the first service advertisement message includes first service information of the first device and second service information of the second device.

The first service information is used to enable a peer device in a communication range of the first device to learn service information of the first device, and the second service information is used to enable a peer device in a communication range of the second device to learn service information of the second device.

Specifically, the first service information includes a service identifier and operating regularity information of the first device, where the service identifier is used to indicate a service provided by the first device, and/or a service needed by the first device; and the operating regularity information may specifically include time information and/or channel information.

Further, the first service information may further include a service information validity period and/or device address information of the first device.

Specifically, the service information validity period may indicate a validity period during which another peer device may carry the service information. The service information is not valid when the validity period expires, and the another peer device no longer carries the service information. In some cases, the service information validity period may be represented by the time information in the operating regularity information, that is, the two are represented by a same value. The validity period may be a time value, and may also be another value, such as the number m of times.

In the foregoing service information, a service information validity period is carried only in source service information (that is, service information of a sender itself), and does not need to be carried in forwarded service information. Address information of a peer device is carried only in the forwarded service information, and does not need to be carried additionally in the source service information (because the address information of a peer device is included in a frame header address field already).

In this embodiment of the present invention, a service advertisement message is used to propagate service information so as to achieve mutual discovery between peer devices. Service information carried in the service advertisement message includes service information of a sender (such as the first service information in this embodiment of the present invention).

204. The first device sends the first service advertisement message.

In practical application, the first device may send the first service advertisement message around in a broadcasting manner, so that as many peer devices as possible can discover a service of the first device.

Optionally, the first device may send the first service advertisement message for $N_P$ times within one service discovery period, where the service discovery period is divided into $N_P$ equal time segments; the first device randomly sends the first service advertisement message one time in each of the equal time segments; and $N_P$ is an integer greater than zero.

Figure 3:
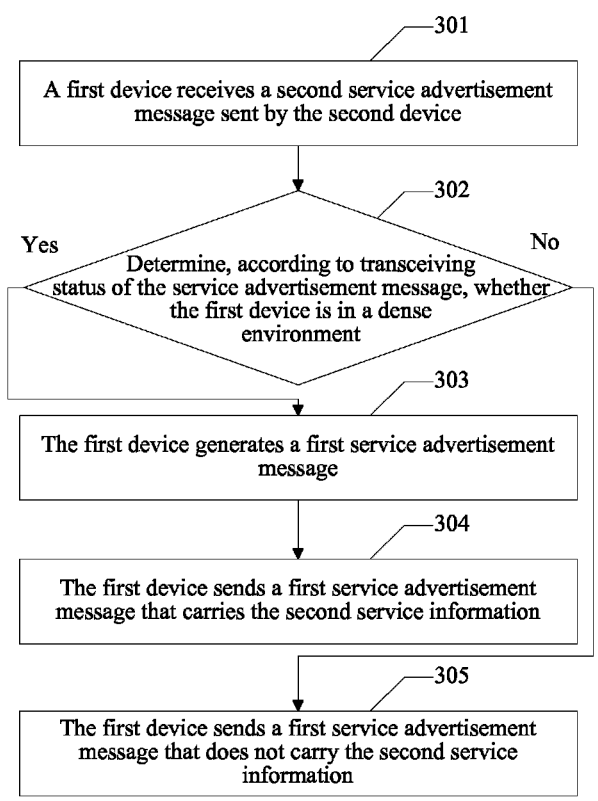
FIG. 3 is another schematic flowchart of a service advertisement message transmission method according to an embodiment of the present invention.

A service advertisement message transmission method in this embodiment of the present invention has higher efficiency when applied in a dense environment. Therefore, an NAN device may select to use the method in a dense environment. For details, reference may be made to FIG. 3. Another embodiment of a service advertisement message transmission method according to an embodiment of the present invention includes:

301. A first device receives a second service advertisement message sent by the second device.

The first device receives the second service advertisement message sent by the second device, where the second service advertisement message carries second service information, and the second device is a peer device of the first device.

The first device adds the second service information to a carrying candidate list, where the carrying candidate list stores non-local service information that can be sent by being carried in the first service advertisement message.

In this embodiment of the present invention, the second service advertisement message may carry only the second service information corresponding to the second device (that is, the second service advertisement message is a service advertisement message sent in a sparse environment); and the second service advertisement message may further carry service information in addition to the second service information (that is, the second service advertisement message is a service advertisement message sent in a dense environment).

The sparse environment and the dense environment in this embodiment of the present invention may be freely defined. For example, a threshold of a quantity of devices is set, where if the quantity of devices in a current network is less than the threshold of the quantity of devices, a current environment is a sparse environment; and if the quantity of devices in the current network is greater than or equal to the threshold of the quantity of devices, the current environment is a dense environment. It may be understood that, there is further another method for defining the sparse environment and the dense environment, which is not specifically defined in this embodiment of the present invention.

Specifically, the second service information includes a service identifier and operating regularity information of the second device, where the service identifier is used to indicate a service provided by the second device, and/or a service needed by the second device; and the operating regularity information may specifically include time information and/or channel information. For example, the time information is wakeup time (that is used to indicate time when a peer device is in an activated state). For example, the channel information is an operating class and a channel number (that represents an operating channel on which a peer device in a monitoring state is to be located). It may be understood that, in practical application, the operating regularity information may further include other content, which is not specifically defined herein.

Further, the second service information may further include a service information validity period and/or device address information of the second device.

Specifically, the service information validity period may indicate a validity period during which another peer device may carry the service information. The service information is not valid when the validity period expires, and the another peer device no longer carries the service information. In some cases, the service information validity period may be represented by the time information in the operating regularity information, that is, the two are represented by a same value. The validity period may be a time value, and may also be another value, such as the number N of times (that is, the another peer device is allowed to carry the service information in only N service discovery request messages).

302. Determine, according to transceiving status of the service advertisement message, whether the first device is in a dense environment.

The first device determines, according to the transceiving status of the service advertisement message, whether the first device is in a dense environment. If the first device is in a dense environment, step 303 is triggered, and the first service advertisement message is sent in a dense mode; and if the first device is not in a dense environment, step 305 is triggered, and the first service advertisement message is sent in a sparse mode. Specifically, the transceiving status may include a quantity of second service advertisement messages received in predefined time or average waiting time for sending the first service advertisement message.

The determining, according to a quantity of service advertisement messages received in the predefined time, whether the first device is in a dense environment may specifically be:

in predefined time $T_0$, separately collecting statistics on the quantity $V_{sparse}$ of received service advertisement messages in a sparse mode and the quantity $V_{dense}$ of received service advertisement messages in a dense mode.

When $\alpha_1 V_{sparse} + \alpha_2 V_{dense} > thr_1$, the device is considered to be in a dense environment, where α1 and α2 are respectively weighting coefficients of $V_{sparse}$ and $V_{dense}$, and $thr_1$ is a first dense environment threshold;

otherwise, the first device is considered to be in a sparse environment.

Optionally, the determining, according to the quantity of service advertisement messages received in the predefined time, whether the first device is in a dense environment may specifically further be:

in predefined time $T_0$, separately collecting statistics on the quantity $V_{sparse}$ of received service advertisement messages in a sparse mode and the quantity $V_{dense}$ of received service advertisement messages in a dense mode.

When $(\alpha_1 V_{sparse} T_1 + \alpha_2 V_{dense} T_2)/T_0 > thr_2$, the device is considered to be in a dense environment, where $\alpha_1$ and $\alpha_2$ are respectively weighting coefficients of $V_{sparse}$ and $V_{dense}$, and $thr_2$ is a second dense environment threshold;

otherwise, the device is considered to be in a sparse environment.

Optionally, the determining, according to the quantity of service advertisement messages received in the predefined time, whether the first device is in a dense environment may specifically further be:

collecting statistics on an average value $T_A$ of waiting time for sending the first service advertisement message, for example, recording W times of waiting time for sending a first detection request message, and dividing the sum of W times of waiting time by W, so as to obtain an average value $T_A$ of waiting time for sending the first detection request message.

If $T_A > thr_3$, the device is considered to be in a dense environment; otherwise, the device is considered to be in a sparse environment. The waiting time is time needed by the first device from monitoring a channel to successfully sending the first service advertisement message; and $thr_3$ is a third dense environment threshold.

It may be understood that, another method for determining whether the first device is in a dense environment is not specifically limited in this embodiment of the present invention.

303. The first device generates a first service advertisement message.

After receiving the second service advertisement message sent by the second device, if the second service advertisement message includes service information of multiple devices, the first device extracts only the second service information of the second device from the second service advertisement message, and stores the second service information in a carrying candidate list of the first device. The first device may select N pieces of second service information from the carrying candidate list of the first device to generate the first service advertisement message, where N is an integer greater than zero; N is less than or equal to a quantity of second service information stored in the carrying candidate list; a total data amount of the N pieces of second service information is less than a message packet capacity of the first service advertisement message; and further optionally, the total data amount of the N pieces of second service information may be closest to the message packet capacity.

After service information that needs to be carried is determined, the first device generates the first service advertisement message, where the first service advertisement message includes first service information of the first device and second service information of N second devices.

The first service information is used to enable a peer device in a communication range of the first device to learn service information of the first device, and the second service information is used to enable a peer device in a communication range of the second device to learn service information of the second device.

Specifically, the first service information includes a service identifier and operating regularity information of the first device, where the service identifier is used to indicate a service provided by the first device, and/or a service needed by the first device; and the operating regularity information may specifically include time information and/or channel information.

Further, the first service information may further include a service information validity period and/or device address information of the first device.

Specifically, the service information validity period may indicate a validity period during which another peer device may carry the service information. The service information is not valid when the validity period expires, and the another peer device no longer carries the service information. In some cases, the service information validity period may be represented by the time information in the operating regularity information, that is, the two are represented by a same value. The validity period may be a time value, and may also be another value, such as the number m of times.

In the foregoing service information, a service information validity period is carried only in source service information (that is, service information of a sender itself), and does not need to be carried in forwarded service information. Device address information is carried only in the forwarded service information, and does not need to be carried additionally in the source service information (because the device address information is included in a frame header address field already).

304. The first device sends the first service advertisement message that carries the second service information.

In practical application, the first device may send the first service advertisement message around in a broadcasting manner, so that as many peer devices as possible can discover a service of the first device.

Optionally, the first device may send the first service advertisement message for $N_P$ times within one service discovery period, where the service discovery period is divided into $N_P$ equal time segments; the first device randomly sends the first service advertisement message one time in each of the equal time segments; and $N_P$ is an integer greater than zero.

305. The first device sends a first service advertisement message that does not carry the second service information.

In this embodiment of the present invention, a rule of determining a dense environment is added, so that when sending a first service advertisement message, a first device can select, according to a result of the determining, whether to add service information of a second device, thereby achieving optimal configuration of resources.

Figure 4:
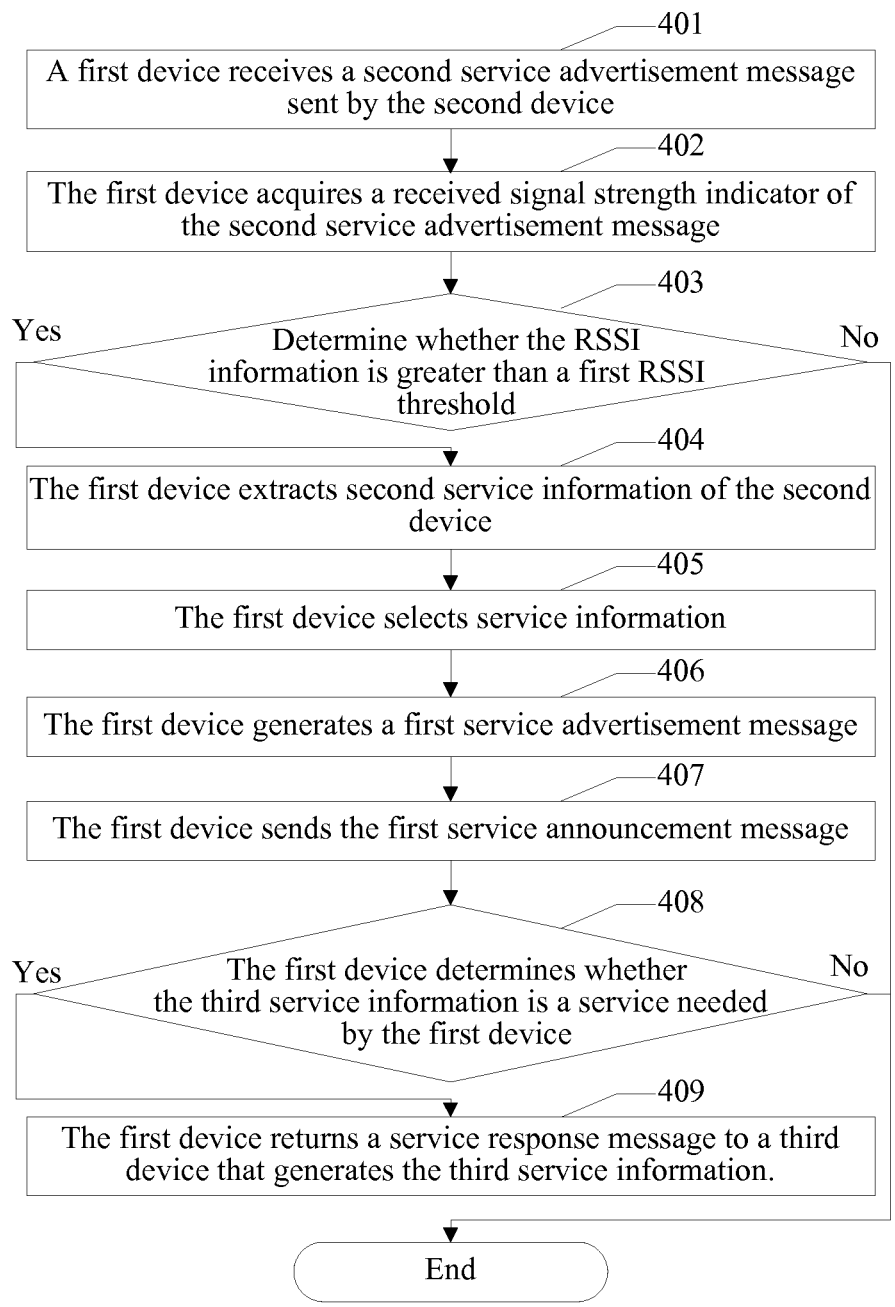
FIG. 4 is another schematic flowchart of a service advertisement message transmission method according to an embodiment of the present invention.

A device in the embodiment of the present invention performs a forwarding operation on non-local service information. Therefore, local service information may be forwarded to a non-reachable node (that is, a node outside a communication range of a device corresponding to the service information). In order to avoid such a case, a corresponding solution is provided in the embodiments of the present invention. Referring to FIG. 4, another embodiment of a service advertisement message transmission method according to an embodiment of the present invention includes:

401. A first device receives a second service advertisement message sent by the second device.

The first device receives the second service advertisement message sent by the second device, where the second service advertisement message carries second service information, and the second device is a peer device of the first device.

Specifically, the second service information includes a service identifier and operating regularity information of the second device, where the service identifier is used to indicate a service provided by the second device, and/or a service needed by the second device; and the operating regularity information may specifically include time information and/or channel information. For example, the time information is wakeup time (that is used to indicate time when a peer device is in an activated state). For example, the channel information is an operating class and a channel number (that represents an operating channel on which a peer device in a monitoring state is to be located). It may be understood that, in practical application, the operating regularity information may further include other content, which is not specifically defined herein.

Further, the second service information may further include a service information validity period and/or device address information of the second device.

Specifically, the service information validity period may indicate a validity period during which another peer device may carry the service information. The service information is not valid when the validity period expires, and the another peer device no longer carries the service information. In some cases, the service information validity period may be represented by the time information in the operating regularity information, that is, the two are represented by a same value. The validity period may be a time value, and may also be another value, such as the number m of times (that is, the another peer device is allowed to carry the service information in only m service discovery request messages).

Optionally, if the second service advertisement message carries third service information, in addition to step 402, step 408 further needs to be performed. Specifically, when the third service information includes device address information of a third device, the first device may send a service response message to the third device in a unicast manner; otherwise, the first device sends the service response message in a broadcasting manner.

402. The first device acquires a received signal strength indicator of the second service advertisement message.

The first device acquires the received signal strength indicator (RSSI, Received Signal Strength Indication) of the second service advertisement message. The RSSI may be obtained by the first device by detecting a received signal.

403. Determine whether the RSSI is greater than a first RSSI threshold.

If the RSSI is greater than the first RSSI threshold, it is determined that the second device is located in a forwarding radius of the first device, and step 404 is performed, where the forwarding radius is a valid radius for forwarding the second service information, that is, if the second device is located in the forwarding radius of the first device, a peer device that receives the second service information forwarded by the first device may communicate with the second device effectively.

If the RSSI is not greater than the first RSSI threshold, the second service information carried in the second service advertisement message is omitted, and a process ends.

In this embodiment of the present invention, the first RSSI threshold is a threshold for determining whether to forward the second service information. When the RSSI obtained by receiving the second service advertisement message is greater than the first RSSI threshold, a local device may be considered to be located in a forwarding radius of the second device (that is, a peer device that receives the second service information forwarded by the local device is located in the communication range of the second device). Therefore, the second service information may be stored in a carrying candidate list of the first device.

404. The first device extracts second service information of the second device.

After receiving the second service advertisement message sent by the second device, if the second service advertisement message includes service information of multiple devices, the first device extracts only the second service information of the second device from the second service advertisement message, and stores the second service information in the carrying candidate list of the first device.

405. The first device selects service information.

The first device may select N pieces of second service information from the carrying candidate list of the first device to generate a first service advertisement message, where N is an integer greater than zero; N is less than or equal to a quantity of second service information stored in the carrying candidate list; a total data amount of the N pieces of second service information is less than a message packet capacity of the first service advertisement message; and further optionally, the total data amount of the N pieces of second service information may be closest to the message packet capacity.

In this embodiment of the present invention, in order to avoid that continuous forwarding of service information of one peer device causes that the service information is forwarded outside a communication range of a device that originally sends the service information, it is limited in this embodiment of the present invention that only service information corresponding to a sender is forwarded. Optionally, according to an actual condition, the first device may further select, from the second service advertisement message, one or two pieces of service information in addition to the second service information for forwarding.

406. The first device generates a first service advertisement message.

After service information that needs to be carried is determined, the first device generates the first service advertisement message, where the first service advertisement message includes first service information of the first device and second service information of the second device.

The first service information is used to enable a peer device in a communication range of the first device to learn service information of the first device, and the second service information is used to enable a peer device in a communication range of the second device to learn service information of the second device.

Specifically, the first service information includes a service identifier and operating regularity information of the first device, where the service identifier is used to indicate a service provided by the first device, and/or a service needed by the first device; and the operating regularity information may specifically include time information and/or channel information.

Further, the first service information may further include a service information validity period and/or device address information of the first device.

Specifically, the service information validity period may indicate a validity period during which another peer device may carry the service information. The service information is not valid when the validity period expires, and the another peer device no longer carries the service information. In some cases, the service information validity period may be represented by the time information in the operating regularity information, that is, the two are represented by a same value. The validity period may be a time value, and may also be another value, such as the number m of times.

Specifically, when service information includes device address information, another peer device may send a service advertisement message or a service response message in a unicast manner; otherwise, the another peer device sends the service advertisement message or the service response message in a broadcasting manner.

In the foregoing service information, a service information validity period is carried only in source service information (that is, service information of a sender itself), and does not need to be carried in forwarded service information. Device address information is carried only in the forwarded service information, and does not need to be carried additionally in the source service information (because the device address information is included in a frame header address field already).

In this embodiment of the present invention, a service advertisement message is used to propagate service information so as to achieve mutual discovery between peer devices. Service information carried in the service advertisement message includes service information of a sender (such as the first service information in this embodiment of the present invention), and may also include service information of a third party (that is, a peer device except the sender and a receiver, such as the second device in this embodiment of the present invention).

407. The first device sends the first service advertisement message.

In practical application, the first device may send the first service advertisement message around in a broadcasting manner, so that as many peer devices as possible can discover a service of the first device.

Optionally, the first device may send the first service advertisement message for $N_P$ times within one service discovery period, where the service discovery period is divided into $N_P$ equal time segments; the first device randomly sends the first service advertisement message one time in each of the equal time segments; and $N_P$ is an integer greater than zero.

408. The first device determines whether the third service information is a service needed by the first device.

If the third service information is a service needed by the first device, step 409 is performed; and if the third service information is not a service needed by the first device, the third service information is ignored.

409. The first device returns a service response message to a third device that generates the third service information.

The first device returns the service response message to the third device that generates the third service information. Optionally, in order to avoid a non-reachable node, before sending the service response message, the first device may acquire the received signal RSSI of the second service advertisement message. If the RSSI is greater than a second RSSI threshold, it is determined that the third device is located in a credible radius of the first device (that is, the third device is located in the communication range of the first device); and the step of returning the service response message to the third device that sends the third service information is triggered.

Optionally, in order to avoid a non-reachable node, relatively low power may also be used to send a service advertisement message, and relatively high power may be used to send a service response message. Specifically, when a device is in a dense mode, relatively low power is used for transmitting, and therefore a transmission range is smaller than that in a sparse mode. Transmit power in the sparse mode is referred to as high power, and transmit power in the dense mode is referred to as low power. Therefore, the key to this solution lies in that, a service advertisement message in the dense mode is transmitted at low power, but high power is used for responding. By properly configuring parameters (low power, a quantity of allowed hops for forwarding, and the like), a response to a non-reachable node can be avoided by using the foregoing method. Obviously, when only one hop of forwarding is allowed, an optimal parameter configuration should meet 2×low power transmission radius=high power transmission radius.

In this embodiment of the present invention, it is assumed that power used to send the service advertisement message between peer devices in the dense mode is equal. The first device may send the service response message to the third device at first power, where the first power is higher than second power used by the second device to send the second service advertisement message. That is, the first device sends the service response message to the third device at relatively high power. Specifically, a transmission radius formed by the first power is M times a transmission radius formed by the second power, where M is an integer greater than one.

Figure 5:
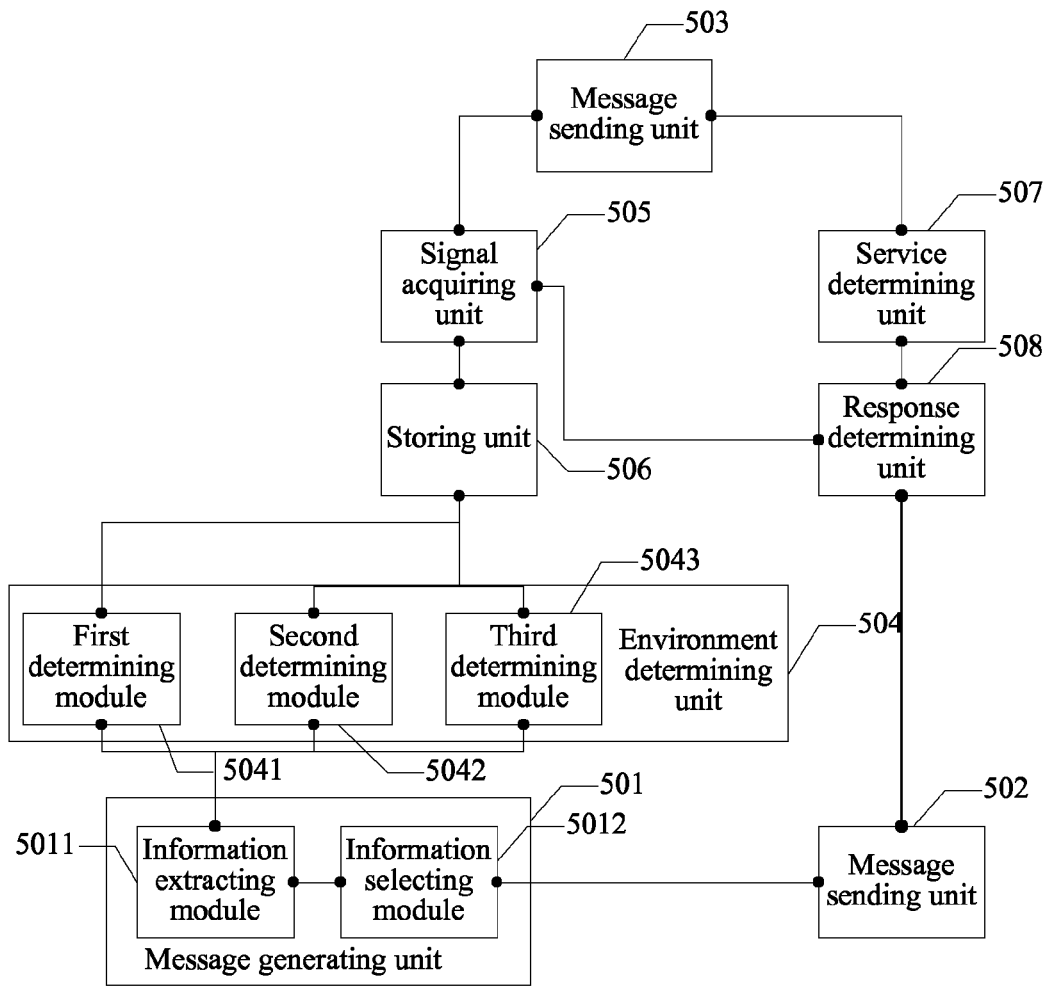
FIG. 5 is a schematic structural diagram of a service advertisement message transmission device according to an embodiment of the present invention.

The following describes an embodiment of a service advertisement message transmission device in the present invention for performing the foregoing service advertisement message transmission method. For a logical structure of the device, refer to FIG. 5. An embodiment of a service advertisement message transmission device according to an embodiment of the present invention includes:

a message generating unit 501, configured to generate a first service advertisement message, where the first service advertisement message includes first service information of a first device and second service information of at least one second device; the second service information is obtained by the first device from a received message sent by the second device; the second device is a peer device of the first device; the first service information is used to enable a peer device in a communication range of the first device to learn service information of the first device; and the second service information is used to enable a peer device in a communication range of the second device to learn service information of the second device; and a message sending unit 502, configured to send the first service advertisement message.

Optionally, the device in this embodiment of the present invention further includes:

a message receiving unit 503, configured to: before the first service advertisement message is generated, receive a second service advertisement message sent by the at least one second device, where the second service advertisement message includes the second service information; and a storing unit 506, configured to add the second service information to a carrying candidate list, where the carrying candidate list stores non-local service information that can be sent by being carried in the first service advertisement message.

Further, the message generating unit 501 includes:

an information extracting module 5011, configured to extract only the second service information of the second device from the second service advertisement message, and store the second service information in a carrying candidate list of the first device; and an information selecting module 5012, configured to select N pieces of second service information from the carrying candidate list of the first device to generate the first service advertisement message, where N is an integer greater than zero; N is less than or equal to a quantity of second service information stored in the carrying candidate list; and a total data amount of the N pieces of second service information is less than a message packet capacity of the first service advertisement message.

The message sending unit 502 is specifically configured to send the first service advertisement message for $N_P$ times within one service discovery period, where the service discovery period is divided into $N_P$ equal time segments; the first device randomly sends the first service advertisement message one time in each of the equal time segments; and $N_P$ is an integer greater than zero.

Optionally, the service advertisement message transmission device in this embodiment of the present invention further includes:

an environment determining unit 504, configured to determine, according to transceiving status of the first service advertisement message, whether the first device is in a dense environment; if the first device is in a dense environment, trigger the message generating unit to generate the first service advertisement message; and if the first device is not in a dense environment, directly trigger the message sending unit to send a first service advertisement message that does not carry the second service information.

Further, the environment determining unit 504 includes:

a first determining module 5041, configured to: in predefined time $T_0$, separately collect statistics on a quantity $V_{sparse}$ of received service advertisement messages in a sparse mode and a quantity $V_{dense}$ of received service advertisement messages in a dense mode, where when $\alpha_1 V_{sparse} + \alpha_2 V_{dense} > thr_1$, the first device is considered to be in a dense environment, where $\alpha 1$ and $\alpha 2$ are respectively weighting coefficients of $V_{sparse}$ and $V_{dense}$, and $thr_1$ is a first dense environment threshold;

or a second determining module 5042, configured to: in predefined time $T_0$, separately collect statistics on a quantity $V_{sparse}$ of received service advertisement messages in a sparse mode and a quantity $V_{dense}$ of received service advertisement messages in a dense mode, where when $(\alpha_1 V_{sparse} T_1 + \alpha_2 V_{dense} T_2)/T_0 > thr_2$, the first device is considered to be in a dense environment, where $\alpha 1$ and $\alpha 2$ are respectively weighting coefficients of $V_{sparse}$ and $V_{dense}$, and $thr_2$ is a second dense environment threshold;

or a third determining module 5043, configured to collect statistics on an average value $T_A$ of waiting time for sending the first service advertisement message, where if $T_A > thr_3$, the first device is considered to be in a dense environment; the waiting time is time needed by the first device from monitoring a channel to successfully sending the first service advertisement message; and $thr_3$ is a third dense environment threshold.

Optionally, the service advertisement message transmission device in this embodiment of the present invention further includes:

a signal acquiring unit 505, configured to acquire an RSSI of the second service advertisement message, where the storing unit 506 is specifically configured to: if the RSSI is greater than a first RSSI threshold, add the second service information to the carrying candidate list of the first device.

Optionally, the device in this embodiment of the present invention further includes:

a service determining unit 507, configured to: if the second service advertisement message carries third service information, determine whether the third service information is a service needed by the first device, where the message sending unit is further configured to: when a result of the determining of the service determining unit is yes, return a service response message to a device that generates the third service information.

Further, the device further includes:

a response determining unit 508, configured to: if the RSSI is greater than a second RSSI threshold, trigger the message sending unit to return the service response message to the device that generates the third service information.

The message sending unit is specifically configured to send, at first power, the service response message to the device corresponding to the third service information, where the first power is higher than second power used by the second device to send the second service advertisement message.

A specific interaction process of each unit in the service advertisement message transmission device in this embodiment of the present invention is as follows:

The message receiving unit 503 receives a second service advertisement message sent by the second device, where the second service advertisement message carries second service information, and the second device is a peer device of the first device.

Specifically, the second service information includes a service identifier and operating regularity information of the second device, where the service identifier is used to indicate a service provided by the second device, and/or a service needed by the second device; and the operating regularity information may specifically include time information and/or channel information. For example, the time information is wakeup time (that is used to indicate time when a peer device is in an activated state). For example, the channel information is an operating class and a channel number (that represents an operating channel on which a peer device in a monitoring state is to be located). It may be understood that, in practical application, the operating regularity information may further include other content, which is not specifically defined herein.

Further, the second service information may further include a service information validity period and/or device address information of the second device.

Specifically, the service information validity period may indicate that another peer device may carry the service information within the validity period. The service information is not valid when the validity period expires, and the another peer device no longer carries the service information. In some cases, the service information validity period may be represented by the time information in the operating regularity information, that is, the two are represented by a same value. The validity period may be a time value, and may also be another value, such as the number m of times (that is, the another peer device is allowed to carry the service information in only m service discovery request messages).

Specifically, when service information includes address information of a peer device, another peer device may send a service advertisement message or a service response message in a unicast manner; otherwise, the another peer device sends the service advertisement message or the service response message in a broadcasting manner.

After receiving the second service advertisement message sent by the second device, if the second service advertisement message includes service information of multiple devices, the first device extracts only the second service information of the second device from the second service advertisement message, and stores the second service information in a carrying candidate list of the first device, where the carrying candidate list is used to store non-local service information that can be sent by being carried in the first service advertisement message. The first device may select N pieces of second service information from the carrying candidate list of the first device to generate the first service advertisement message, where N is an integer greater than zero; N is less than or equal to a quantity of second service information stored in the carrying candidate list; a total data amount of the N pieces of second service information is less than a message packet capacity of the first service advertisement message; and further optionally, the total data amount of the N pieces of second service information may be closest to the message packet capacity.

Optionally, if the second service advertisement message carries third service information, the service determining unit 507 determines whether the third service information is a service needed by the first device. If the third service information is a service needed by the first device, the message sending unit is triggered to return a service response message to a device that generates the third service information.

Optionally, in order to avoid a non-reachable node, before the service response message is sent, the signal acquiring unit 505 may acquire a received signal RSSI of the second service advertisement message. If the RSSI is greater than a second RSSI threshold, the response determining unit 508 determines that the third device is located in a credible radius of the first device (that is, the third device is located in the communication range of the first device); and the step of returning the service response message to the third device that sends the third service information is triggered.

Optionally, in order to avoid a non-reachable node, relatively low power may further be used to send a service advertisement message, and relatively high power may further be used to send a service response message. Specifically, when a device is in a dense mode, relatively low power is used for transmitting, and therefore a transmission range is smaller than that in a sparse mode. Transmit power in the sparse mode is referred to as high power, and transmit power in the dense mode is referred to as low power. Therefore, the key to this solution lies in that, a service advertisement message in the dense mode is transmitted at low power, but high power is used for responding. By properly configuring parameters (low power, allowed hop counts of forwarding, and the like), a response to a non-reachable node can be avoided in the foregoing method. Obviously, when only one hop of forwarding is allowed, an optimal parameter configuration should meet 2×low power transmission radius=high power transmission radius.

Optionally, after the second service advertisement message is acquired, the RSSI of the second service advertisement message may be acquired by the signal acquiring unit 505. If the RSSI is greater than a first RSSI threshold, the storing unit 506 determines that the second device is located in a forwarding radius of the first device; and extracts the second service information of the second device.

After the second service advertisement message is acquired, whether the first device is in a dense environment may further be determined by the environment determining unit 504 according to a quantity of service advertisement messages received in predefined time. If the first device is in a dense environment, the message generating unit is triggered; and if the first device is not in a dense environment, the message sending unit is directly triggered to send a first service advertisement message that does not carry the second service information.

Specifically, a dense environment may be determined by the first determining module 5041 by, in predefined time $T_0$, separately collecting statistics on the quantity $V_{sparse}$ of received service advertisement messages in a sparse mode and the quantity $V_{dense}$ of received service advertisement messages in a dense mode, where when $\alpha_1 V_{sparse} + \alpha_2 V_{dense} > thr_1$, the device is considered to be in a dense environment, where $\alpha_1$ and $\alpha_2$ are respectively weighting coefficients of $V_{sparse}$ and $V_{dense}$, and $thr_1$ is a first dense environment threshold; otherwise, the device is considered to be in a sparse environment.

A dense environment may also be determined by the second determining module 5042 by, in predefined time $T_0$, separately collecting statistics on the quantity $V_{sparse}$ of received service advertisement messages in a sparse mode and the quantity $V_{dense}$ of received service advertisement messages in a dense mode, where when $(\alpha_1 V_{sparse} T_1 + \alpha_2 V_{dense} T_2)/T_0 > thr_2$, the device is considered to be in a dense environment, where $\alpha_1$ and $\alpha_2$ are respectively weighting coefficients of $V_{sparse}$ and $V_{dense}$, and $thr_2$ is a second dense environment threshold; otherwise, the device is considered to be in a sparse environment.

A dense environment may also be determined by the third determining module 5043 by collecting statistics on an average value $T_A$ of waiting time for sending the first service advertisement message. If $T_A > thr_3$, the device is considered to be in a dense environment; otherwise, the device is considered to be in a sparse environment. The waiting time is time needed by the first device from monitoring a channel to successfully sending the first service advertisement message.

After service information that needs to be carried is determined, the message generating unit 501 generates the first service advertisement message, where the first service advertisement message includes first service information of the first device and second service information of N second devices.

The first service information is used to enable a peer device in a communication range of the first device to learn service information of the first device, and the second service information is used to enable a peer device in a communication range of the second device to learn service information of the second device.

Specifically, the first service information includes a service identifier and operating regularity information of the first device, where the service identifier is used to indicate a service provided by the first device, and/or a service needed by the first device; and the operating regularity information may specifically include time information and/or channel information.

Further, the first service information may further include a service information validity period and/or device address information of the first device.

Specifically, the service information validity period may indicate that another peer device may carry the service information within the validity period. The service information is not valid when the validity period expires, and the another peer device no longer carries the service information. In some cases, the service information validity period may be represented by the time information in the operating regularity information, that is, the two are represented by a same value. The validity period may be a time value, and may also be another value, such as the number m of times.

Specifically, when service information includes address information of a peer device, another peer device may send a service advertisement message or a service response message in a unicast manner; otherwise, the another peer device sends the service advertisement message or the service response message in a broadcasting manner.

In the foregoing service information, a service information validity period is carried only in source service information (that is, service information of a sender itself), and forwarded service information does not need to carry the service information validity period. Address information of a peer device is carried only in the forwarded service information, and the source service information does not need to carry the address information of a peer device additionally (because the address information of a peer device is included in a frame header address field already).

After the first service advertisement message is generated, the message sending unit 502 may send the first service advertisement message around in a broadcasting manner, so that as many peer devices as possible can discover the first device.

Optionally, the message sending unit 502 may send the first service advertisement message for $N_P$ times within one service discovery period, where the service discovery period is divided into $N_P$ equal time segments; the first device randomly sends the first service advertisement message one time in each of the equal time segments; and $N_P$ is an integer greater than zero.

An embodiment of the present invention further provides a computer storage medium, where the computer storage medium can store a program and the program performs a part or all of steps of a service advertisement message transmission method that are recorded in the foregoing method embodiments.

Figure 6:
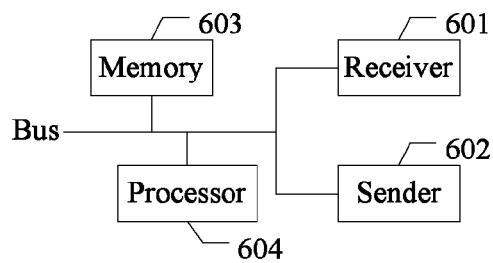
FIG. 6 is a schematic structural diagram of a device according to an embodiment of the present invention.

Referring to FIG. 6, an embodiment of the present invention further provides a service advertisement message transmission device, where the device is a first device, and may specifically include:

a receiver 601, a sender 602, a memory 603, and a processor 604 (a quantity of processors in the device may be one or more, and one processor is used as an example in FIG. 6). In some embodiments of the present invention, the receiver 601, the sender 602, the memory 603, and the processor 604 may be connected to each other by using a bus or in another manner, and that a connection is implemented by using a bus is used as an example in FIG. 6

The memory 603 may be configured to store the following content:

the first service advertisement message, which includes first service information of the first device and second service information of a second device, where the second service information is obtained by the first device from a received message sent by the second device; the first service information is used to enable a device in a communication range of the first device to learn service information of the first device; and the second service information is used to enable a device in a communication range of the second device to learn service information of the second device; and the second service advertisement message, which includes the second service information, where the carrying candidate list is used to store non-local service information that can be sent by being carried in the first service advertisement message.

The first service information includes a service identifier and operating regularity information of the first device;

the second service information includes a service identifier and operating regularity information of the second device; and the operating regularity information includes time information and/or channel information.

The first service information may further include a service information validity period and/or device address information of the first device; and the second service information may further include a service information validity period and/or device address information of the second device.

The receiver 601 is configured to receive the second service advertisement message sent by the second device.

The sender 602 is configured to send the first service advertisement message, and may further be configured to return a service response message to a device that generates third service information.

The processor 604 is configured to perform the following steps:

after the receiver 601 receives the second service advertisement message sent by the second device, if the second service advertisement message includes service information of multiple devices, extracting only the second service information of the second device from the second service advertisement message, and storing the second service information in a carrying candidate list of the first device; and selecting, from the carrying candidate list of the first device according to a message packet capacity of the first service advertisement message, N pieces of service information as information that the first service advertisement message needs to carry, where N is an integer greater than zero.

Optionally, if the second service advertisement message carries the third service information, it is determined whether the third service information is a service needed by the first device. If the third service information is a service needed by the first device, the sender 602 is instructed to return the service response message to the device that generates the third service information.

Optionally, in order to avoid a non-reachable node, before the service response message is sent, a received signal RSSI of the second service advertisement message may be acquired. If the RSSI is greater than a second RSSI threshold, it is determined that the third device is located in a credible radius of the first device (that is, the third device is located in the communication range of the first device); and the step of returning the service response message to the third device that sends the third service information is triggered.

Optionally, in order to avoid a non-reachable node, relatively low power may further be used to send a service advertisement message, and relatively high power may further be used to send a service response message. Specifically, when a device is in a dense mode, relatively low power is used for transmitting, and therefore a transmission range is smaller than that in a sparse mode. Transmit power in the sparse mode is referred to as high power, and transmit power in the dense mode is referred to as low power. Therefore, the key to this solution lies in that, a service advertisement message in the dense mode is transmitted at low power, but high power is used for responding. By properly configuring parameters (low power, allowed hop counts of forwarding, and the like), a response to a non-reachable node can be avoided in the foregoing method. Obviously, when only one hop of forwarding is allowed, an optimal parameter configuration should meet 2×low power transmission radius=high power transmission radius.

Optionally, after the second service advertisement message is acquired, the RSSI of the second service advertisement message may be acquired. If the RSSI is greater than a first RSSI threshold, it is determined that the second device is located in a forwarding radius of the first device; and the second service information of the second device is extracted.

After the second service advertisement message is acquired, whether the first device is in a dense environment may further be determined according to a quantity of service advertisement messages received in predefined time. If the first device is in a dense environment, the message generating unit is triggered; and if the first device is not in a dense environment, the message sending unit is directly triggered to send a first service advertisement message that does not carry the second service information.

Specifically, a dense environment may be determined by, in predefined time $T_0$, separately collecting statistics on the quantity $V_{sparse}$ of received service advertisement messages in a sparse mode and the quantity $V_{dense}$ of received service advertisement messages in a dense mode, where when $\alpha_1 V_{sparse} + \alpha_2 V_{dense} > thr_1$, the device is considered to be in a dense environment, where $\alpha_1$ and $\alpha_2$ are respectively weighting coefficients of $V_{sparse}$ and $V_{dense}$, and $thr_1$ is a first dense environment threshold; otherwise, the device is considered to be in a sparse environment.

A dense environment may also be determined by, in predefined time $T_0$, separately collecting statistics on the quantity $V_{sparse}$ of received service advertisement messages in a sparse mode and the quantity $V_{dense}$ of received service advertisement messages in a dense mode, where when $(\alpha_1 V_{sparse} T_1 + \alpha_2 V_{dense} T_2)/T_0 > thr_2$, the device is considered to be in a dense environment, where α1 and α2 are respectively weighting coefficients of $V_{sparse}$ and $V_{dense}$, and $thr_2$ is a second dense environment threshold; otherwise, the device is considered to be in a sparse environment.

A dense environment may also be determined by collecting statistics on an average value $T_A$ of waiting time for sending the first service advertisement message. If $T_A > thr_3$, the device is considered to be in a dense environment; otherwise, the device is considered to be in a sparse environment. The waiting time is time needed by the first device from monitoring a channel to successfully sending the first service advertisement message.

After service information that needs to be carried is determined, the first service advertisement message is generated, where the first service advertisement message includes the first service information of the first device and the second service information of the second device.

After the first service advertisement message is generated, the sender 602 may be instructed to send the first service advertisement message around in a broadcasting manner, so that as many peer devices as possible can discover a service of the first device.

Optionally, the sender 602 may be instructed to send the first service advertisement message for $N_P$ times within one service discovery period, where the service discovery period is divided into $N_P$ equal time segments; the first device randomly sends the first service advertisement message one time in each of the equal time segments; and $N_P$ is an integer greater than zero.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service advertisement message transmission method, comprising:
    generating, by a first device, a first service advertisement message, wherein the first service advertisement message comprises first service information of the first device and second service information of at least one second device; the second service information is obtained by the first device from a received message sent by the at least one second device; the first service information is used to enable a device in a communication range of the first device to learn service information of the first device; and the second service information is used to enable a device in a communication range of the at least one second device to learn service information of the at least one second device; and sending, by the first device, the first service advertisement message, before the generating a first service advertisement message, the method further comprising:

receiving a second service advertisement message sent by the at least one second device, wherein the second service advertisement message comprises the second service information; and adding the second service information to a carrying candidate list, wherein the carrying candidate list is used to store non-local service information that can be carried in the first service advertisement message for sending, wherein if the second service advertisement message comprises service information of multiple devices, the generating a first service advertisement message comprises;

extracting only the second service information of the at least one second device from the second service advertisement message, and storing the second service information in the carrying candidate list of the first device; and selecting N pieces of second service information from the carrying candidate list of the first device to generate the first service advertisement message, wherein N is an integer greater than zero; N is less than or equal to a quantity of second service information stored in the carrying candidate list; and a total data amount of the N pieces of second service information is smaller than a message packet capacity of the first service advertisement message.

2. The method according to claim 1, wherein:
the first service information comprises a service identifier and operating regularity information of the first device;
the second service information comprises a service identifier and operating regularity information of the at least one second device; and
the operating regularity information comprises time information and/or channel information.

3. The method according to claim 2, wherein:
the first service information further comprises a service information validity period and/or device address information of the first device; and
the second service information further comprises a service information validity period and/or device address information of the at least one second device.

4. The method according to claim 1, after the receiving the second service advertisement message sent by the at least one second device, further comprising:
acquiring a received signal strength indicator RSSI of the second service advertisement message, wherein the adding the second service information to a carrying candidate list comprising:
if the RSSI is greater than a first RSSI threshold, adding the second service information to the carrying candidate list of the first device.

5. A service advertisement message transmission method, comprising:

generating, by a first device, a first service advertisement message, wherein the first service advertisement message comprises first service information of the first device and second service information of at least one second device; the second service information is obtained by the first device from a received message sent by the at least one second device; the first service information is used to enable a device in a communication range of the first device to learn service information of the first device; and the second service information is used to enable a device in a communication range of the at least one second device to learn service information of the at least one second device; and sending, by the first device, the first service advertisement message, wherein before the generating a first service advertisement message, the method further comprising:

receiving a second service advertisement message sent by the at least one second device, wherein the second service advertisement message comprises the second service information; and adding the second service information to a carrying candidate list, wherein the carrying candidate list is used to store non-local service information that can be carried in the first service advertisement message for sending; and, wherein before the generating a first service advertisement message, the method further comprising:

determining, according to transceiving status of the first or the second service advertisement message, whether the first device is in a dense environment;

if the first device is in a dense environment, triggering the generating a first service advertisement message; and if the first device is not in a dense environment, sending a first service advertisement message that does not carry the second service information.

6. The method according to claim 5, wherein the determining, according to transceiving status of the first or the second service advertisement message, whether the first device is in a dense environment comprises:

in predefined time $T_0$, separately collecting statistics on the quantity $V_{sparse}$ of received the second service advertisement messages in a sparse mode and the quantity $V_{dense}$ of received the second service advertisement messages in a dense mode, wherein when $\alpha_1 V_{sparse} + \alpha_2 V_{dense} > thr_1$, the first device is considered to be in a dense environment, wherein $\alpha1$ and $\alpha2$ are respectively weighting coefficients of $V_{sparse}$ and $V_{dense}$, and $thr_1$ is a first dense environment threshold; or when $(\alpha_1 V_{sparse} T_1 + \alpha_2 V_{dense} T_2)/T_0 > thr_2$, the first device is considered to be in a dense environment, wherein $\alpha_1$ and $\alpha_2$ are respectively weighting coefficients of $V_{sparse}$ and $V_{dense}$, and $thr_2$ is a second dense environment threshold; or collecting statistics on an average value $T_A$ of waiting time for sending the first service advertisement message, wherein if $T_A > thr_3$, the first device is considered to be in a dense environment; the waiting time is time needed by the first device from monitoring a channel to successfully sending the first service advertisement message; and $thr_3$ is a third dense environment threshold.

7. A service advertisement message transmission method, comprising:
generating, by a first device, a first service advertisement message, wherein the first service advertisement message comprises first service information of the first device and second service information of at least one second device; the second service information is obtained by the first device from a received message sent by the at least one second device; the first service information is used to enable a device in a communication range of the first device to learn service information of the first device; and the second service information is used to enable a device in a communication range of the at least one second device to learn service information of the at least one second device; and sending, by the first device, the first service advertisement message, the method further comprising:

before the generating a first service advertisement message, comprising:

receiving a second service advertisement message sent by the at least one second device, wherein the second service advertisement message comprises the second service information; and adding the second service information to a carrying candidate list, wherein the carrying candidate list is used to store non-local service information that can be carried in the first service advertisement message for sending, wherein if the second service advertisement message further carries third service information, the method further comprises:

determining whether the third service information is a service needed by the first device, and if the third service information is a service needed by the first device, returning a service response message to a third device that generates the third service information.

8. The method according to claim 7, before the returning a service response message to a third device that generates the third service information, further comprising:

acquiring the RSSI of the second service advertisement message; and if the RSSI is greater than a second RSSI threshold, triggering the returning a service response message to a third device that generates the third service information.

9. The method according to claim 7, wherein the returning a service response message to a third device that generates the third service information is specifically:

sending the service response message to the third device at first power, wherein the first power is higher than second power used by the at least one second device to send the second service advertisement message.

10. A service advertisement message transmission device, wherein the device is a first device, comprising:

a memory storing at least one instruction; and at least one processor in communication with the memory and executing the at least one instruction to:

generate a first service advertisement message, wherein the first service advertisement message comprises first service information of the first device and second service information of at least one second device; the second service information is obtained by the first device from a received message sent by the at least one second device; the first service information is used to enable a device in a communication range of the first device to learn service information of the first device; and the second service information is used to enable a device in a communication range of the at least one second device to learn service information of the at least one second device; send the first service advertisement message;

before the first service advertisement message is generated, receive a second service advertisement message sent by the at least one second device, wherein the second service advertisement message comprises the second service information;

add the second service information to a carrying candidate list, wherein the carrying candidate list stores non-local service information that can be carried in the first service advertisement message for sending;

extract only the second service information of the at least one second device from the second service advertisement message, and store the second service information in a carrying candidate list of the first device; and select N pieces of second service information from the carrying candidate list of the first device to generate the first service advertisement message, wherein N is an integer greater than zero; N is less than or equal to a quantity of second service information in the carrying candidate list; and a total data amount of the N pieces of second service information is smaller than a message packet capacity of the first service advertisement message.

11. The device according to claim 10, wherein the processor is further configured to acquire an RSSI of the second service advertisement message, wherein if the RSSI is greater than a first RSSI threshold, the processor is configured to add the second service information to the carrying candidate list of the first device.

12. A service advertisement message transmission device, wherein the device is a first device, comprising:

a memory storing at least one instruction; and at least one processor in communication with the memory and executing the at least one instruction to:

generate a first service advertisement message, wherein the first service advertisement message comprises first service information of the first device and second service information of at least one second device; the second service information is obtained by the first device from a received message sent by the at least one second device; the first service information is used to enable a device in a communication range of the first device to learn service information of the first device; and the second service information is used to enable a device in a communication range of the at least one second device to learn service information of the at least one second device, send the first service advertisement message; and determine, according to transceiving status of the first service advertisement message, whether the first device is in a dense environment; if the first device is in a dense environment, trigger the message generating unit to generate the first service advertisement message; and if the first device is not in a dense environment, trigger the message sending unit to send a first service advertisement message that does not carry the second service information.

13. The device according to claim 12, wherein the processor is further configured to:

in predefined time $T_0$, separately collect statistics on a quantity $V_{sparse}$ of received the second service advertisement messages in a sparse mode and a quantity $V_{dense}$ of received the second service advertisement messages in a dense mode, wherein when $\alpha_1 V_{sparse} + \alpha_2 V_{dense} > thr_1$, the first device is considered to be in a dense environment, wherein $\alpha_1$ and $\alpha_2$ are respectively weighting coefficients of $V_{sparse}$ and $V_{dense}$, and $thr_1$ is a first dense environment threshold;

or in predefined time $T_0$, separately collect statistics on a quantity $V_{sparse}$ of received the second service advertisement messages in a sparse mode and a quantity $V_{dense}$ of received the second service advertisement messages in a dense mode, wherein when $(\alpha_1 V_{sparse} T_1 + \alpha_2 V_{dense} T_2)/T_0 > thr_2$, the first device is considered to be in a dense environment, wherein $\alpha_1$ and $\alpha_2$ are respectively weighting coefficients of $V_{sparse}$ and $V_{dense}$, and $thr_2$ is a second dense environment threshold;

or in predefined time, collect statistics about an average value TA of waiting time for sending the first service advertisement message, or calculate an average value $T_A$ of several times of waiting time for sending the first service advertisement message, wherein if $T_A > thr_3$, the first device is considered to be in a dense environment; the waiting time is time needed by the first device from monitoring a channel to successfully sending the first service advertisement message; and $thr_3$ is a third dense environment threshold.

14. A service advertisement message transmission device, wherein the device is a first device, comprising:
  a memory storing at least one instruction; and
  at least one processor in communication with the memory and executing the at least one instruction to:
    generate a first service advertisement message, wherein the first service advertisement message comprises first service information of the first device and second service information of at least one second device; the second service information is obtained by the first device from a received message sent by the at least one second device; the first service information is used to enable a device in a communication range of the first device to learn service information of the first device; and the second service information is used to enable a device in a communication range of the at least one second device to learn service information of the at least one second device; and
    send the first service advertisement message;
    before the first service advertisement message is generated, receive a second service advertisement message sent by the at least one second device, wherein the second service advertisement message comprises the second service information;
    add the second service information to a carrying candidate list, wherein the carrying candidate list stores non-local service information that can be carried in the first service advertisement message for sending
  if the second service advertisement message further carries third service information, determine whether the third service information is a service needed by the first device; and
  when a result of the determining of the service determining unit is yes, return a service response message to a third device that generates the third service information.

15. The device according to claim 14, wherein the processor is further configured to: if the RSSI is greater than a second RSSI threshold, trigger the message sending unit to return the service response message to the device that generates the third service information.

16. The device according to claim 14, wherein the processor is further configured to send, at first power, the service response message to the third device that generates the third service information corresponding to the third service information, wherein the first power is higher than second power used by the at least one second device to send the second service advertisement message.

* * * * *

UNITED STATES PATENT AND TRADEMARK OFFICE
CERTIFICATE OF CORRECTION

PATENT NO.         : 10,004,059 B2
APPLICATION NO.    : 14/881682
DATED              : June 19, 2018
INVENTOR(S)        : Zhenguo Du et al.

Page 1 of 1

It is certified that error appears in the above-identified patent and that said Letters Patent is hereby corrected as shown below:

In the Claims

Column 25, Line 26:
In Claim 1, delete "comprises;" and insert -- comprises: --, therefore.

Column 28, Line 48:
In Claim 12, delete "device," and insert -- device; --, therefore.

Signed and Sealed this
Ninth Day of October, 2018

Andrei Iancu
*Director of the United States Patent and Trademark Office*